Aug. 10, 1965   H. GIESEMANN   3,199,790
SPRAYING APPARATUS FOR THE PRODUCTION OF FOAMED PLASTIC
MATERIALS FOR USE AS FILLERS AND INSULATIONS
Filed Nov. 15, 1962   2 Sheets-Sheet 1
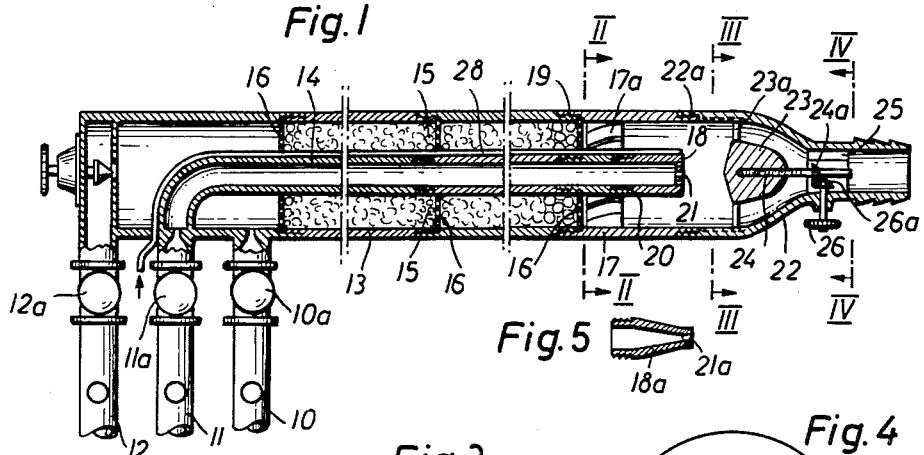
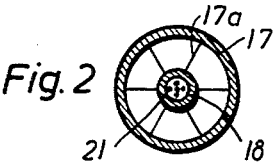
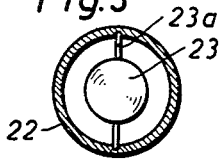
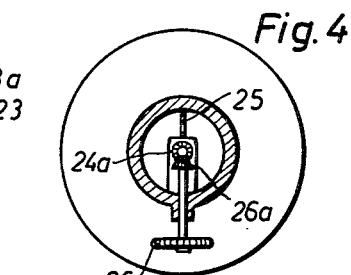
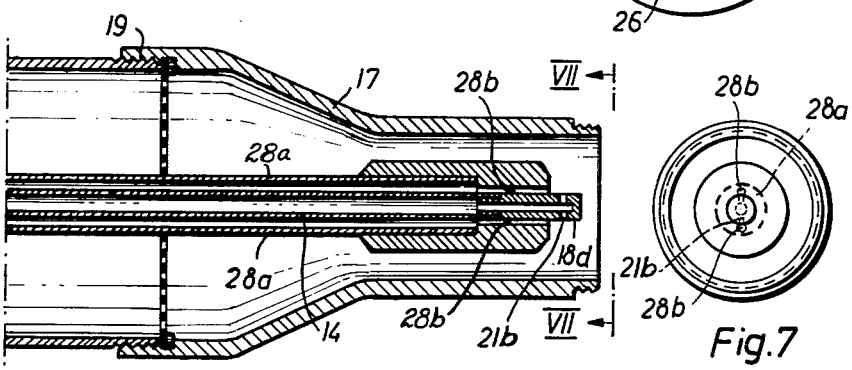
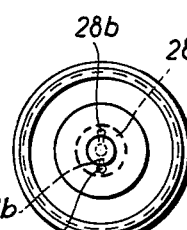
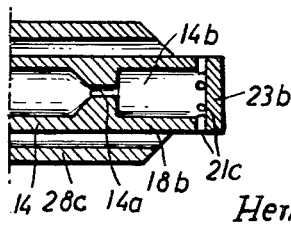
INVENTOR
Herbert Giesemann
BY
Lowry & Rinehart
ATTYS.

Aug. 10, 1965   H. GIESEMANN   3,199,790
SPRAYING APPARATUS FOR THE PRODUCTION OF FOAMED PLASTIC
MATERIALS FOR USE AS FILLERS AND INSULATIONS
Filed Nov. 15, 1962   2 Sheets-Sheet 2
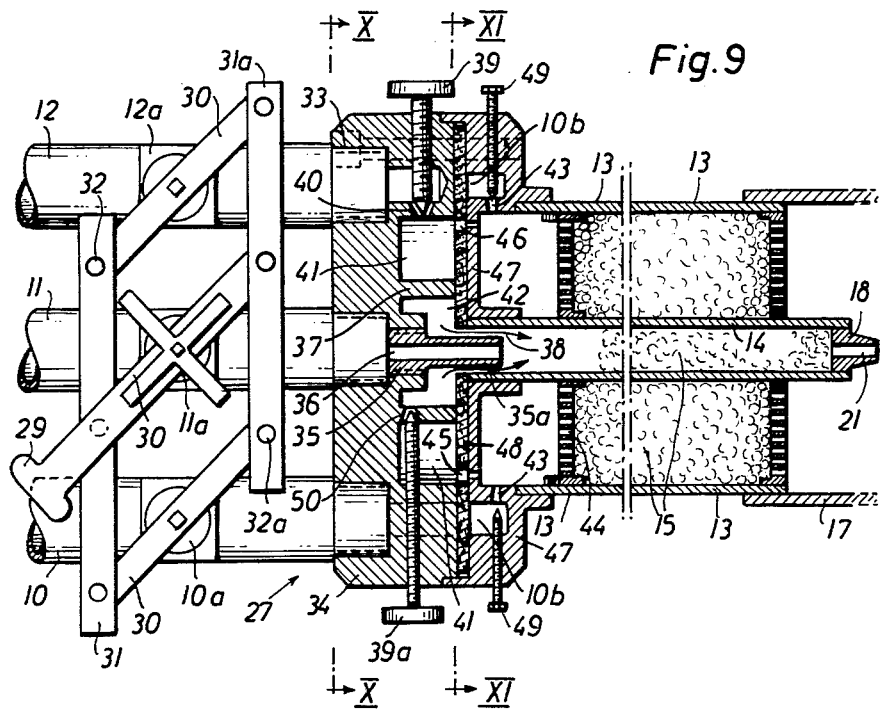
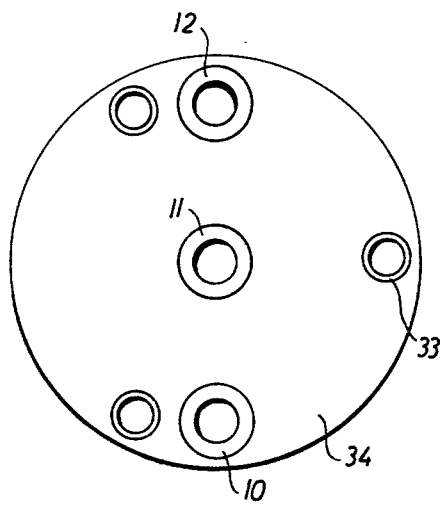
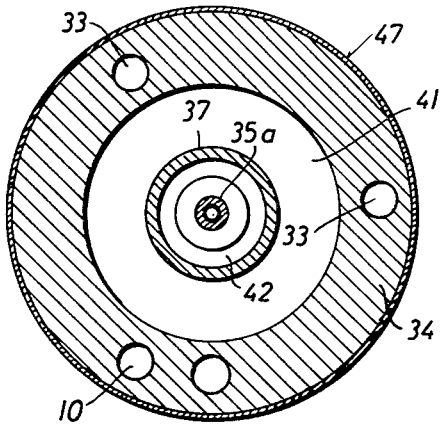
INVENTOR
*Herbert Giesemann*
BY
*Lowry + Rinehart*
ATTYS.

３,199,790
SPRAYING APPARATUS FOR THE PRODUCTION
OF FOAMED PLASTIC MATERIALS FOR USE
AS FILLERS AND INSULATIONS
Herbert Giesemann, Don Bosco Str. 3, Bonn, Germany
Filed Nov. 15, 1962, Ser. No. 237,940
Claims priority, application Germany, Nov. 15, 1961,
G 33,593; Mar. 3, 1962, G 34,394
12 Claims. (Cl. 239—428)

This invention relates to a spraying apparatus for the production of foamed plastic materials which are obtained by mixing a prepared liquid foam solution with a hardenable synthetic resin solution, preferably likewise in the form of an atomized or foamed solution, especially for use as fillers and insulations.

Particularly in the insulating industry foamed plastic materials are widely used for instance in the form of sheets, tubes and the like, for the construction of heat, cold and acoustic insulations. The foamed plastic material is obtained from components, one of which, the foam-forming solution proper, contains a hardening agent for the other component, the synthetic resin solution. When these two components are mixed, the necessary hardening of the resin is initiated and the foamed material is thereby stabilized.

Apparatus is already known in which the foam-forming solution and the synthetic resin solution are foamed in separate containers and both foamed agents are introduced by separate pipes into a mixing chamber. Moreover, it is also known to foam exclusively the foam-forming solution and to spray the synthetic resin solution without the addition of air unfoamed into the mixing chamber by a nozzle from the side. In both devices, the mixing of the two agents is carried out in such a manner that one agent is introduced from the side into the other agent. Such mixing is, however, incomplete when both agents flow together. It has therefore been tried to improve the mixing effect by the provision of further subsequent mixing chambers. This is a disadvantage, if the mixed agents have to be hardened very quickly since the mixing chambers are easily clogged. To obtain an unobjectionable synthetic resin foam, it is necessary that the foam proper be penetrated intensely and quickly by the synthetic resin solution so that the stabilizing effect of the hardening agent is obtained. By the introduction in lateral direction, the mixing effect is not obtained in a sufficient manner. For obtaining an unobjectionably mixed foam and for the production of foams with different specific weights, it is necessary to regulate the supply of both above-mentioned agents as well as of the gas, preferably air, so that the foam-forming agent and the synthetic resin solution are foamed as much as possible during the spraying operation. The known devices have no way to regulate the operational conditions in the mixing chamber. Further, the foam-forming agent itself practically does not contribute to mixing as it is merely pressed through an opening into the mixing chamber.

The present invention is concerned with a development of a spraying apparatus for the production of foamed plastic materials in which at least two conveying pipes are provided discharging into a mixing chamber for delivering the two components of the foamed plastic material. The invention is especially designed to have the conveying pipes for the components to be mixed of the foamed plastic material disposed substantially in parallel and preferably coaxially, the one within the other, and to discharge into a mixing chamber, and that an atomizing means be provided for finely dividing the components of the foamed plastic material. For the purpose of atomization, an additional pipe is preferably provided for supplying a pressurized gas and the outlet orifice of this pipe is so orientated that the gas jet will cross or intersect the issuing synthetic resin solution. In another embodiment of the invention, the fine division and distribution of the synthetic resin solution in the mixing chamber is effected thereby that an impingement member is located at least opposite the outlet orifice of the pipe conveying the synthetic resin solution. The foaming in each pipe may further be effected by balls of glass or the like which are disposed within the pipe and are moved by the passing agents with the addition of a gas, preferably pressure air, so that an enrichment with air is obtained. The above-mentioned atomizing or whirling means may be used separately or in any combination. The agents to be mixed may be passed through each of these pipes. If the pipes are disposed coaxially within each other, each agent may be passed through the inner or outer pipe.

By the formation of the spraying apparatus according to the invention there is obtained a thorough commixture of the two components in the mixing chamber and it is assured that substantially all the bubbles of the foam-forming agent are permeated with the finest dissolution of the synthetic resin solution and are quickly stabilized by the presence of the hardening agent. The impingement of the synthetic resin solution on the impingement member finely atomizes the solution in the mixing chamber. Preferably a swirl may be imparted to the foam-forming agent as it enters the mixing chamber, for instance by means of blading, deflectors and the like contrived to impress rotary motion upon the foam-forming agent as it passes over these devices. The admission of compressed air further atomizes the synthetic resin solution or transforms the synthetic resin into a mist in the foam.

Frequently the components of the foamed plastic material as well as the gas are conveyed to the spraying apparatus through flexible tubing, especially when an insulation of foamed plastic material is to be applied to a building in situ. Flexible tubes are apt to twist and kink and when this happens the supply of the components entering the mixing chamber is throttled in an undesirable and above all uncontrollable manner so that the components of the foamed plastic material are not supplied to the spraying apparatus in the desired proportions and under the desired pressure conditions. Such occurrences may give rise to trouble in the actual formation of the required foamed plastic and may also cause the spraying apparatus to become choked. This drawback can be overcome by providing the spraying apparatus with a distributor head provided with parallel admission pipes which are also parallel to the pipes which convey the components and/or with parallel or coaxial admission chambers. Preferably admission valves in the distributor head are coupled and operable by a single control lever so that the two components and the air can be cut off and switched on simultaneously. Faulty valve operation and work stoppages are thereby prevented which may cause unequal mixtures of the issuing foam as well as clogging and contamination of the pipes and nozzles.

The invention will now be described with reference to the accompanying drawings which illustrate, by way of example, preferred embodiments thereof, and in which:

FIG. 1 is a longitudinal sectional view of one form of the invention;

FIG. 2 is a cross-section taken on the line II—II in FIG. 1;

FIG. 3 is a cross-section taken on the line III—III in FIG. 1;

FIG. 4 is a cross-section taken on the line IV—IV in FIG. 1;

FIG. 5 is a detail sectional view of another form of sprayer head for the admission pipe;

FIG. 6 is a longitudinal sectional view of a spraying apparatus in which an emerging synthetic resin solution is atomized by a compressed air jet;

FIG. 7 is an end elevation looking from line VII—VII on FIG. 6;

FIG. 8 is a detail sectional view of another atomizing device comprising an impingement plate;

FIG. 9 is a fragmentary side elevational view of another spraying apparatus comprising a distributor head partly broken away and shown in section for the admission of the components of the foamed plastic and air;

FIG. 10 illustrates in section the end of the distributor head taken on the line X—X in FIG. 9; and FIG. 11 is a section of the distributor head taken on the line XI—XI in FIG. 9.

As shown in FIG. 1, a foam forming medium and a suitable material which is stabilized, such as a synthetic resin, urea resin, or carbamid resin are withdrawn from containers, not shown, through pipes 10 and 11. Both components are in the form of liquid solutions. A propellant, which may be compressed air, is also admitted into the apparatus through a pipe 12. The supply of the liquid components may also be effected by pump means, such as gear pumps. If compressed air is used as the propellant, pressure valves such as low pressure regulating valve 10a, 11a, 12a are conveniently provided for adjusting the pressures in an admission pipe 13 for the foam forming medium proper and in admission pipe 14 for the synthetic resin solution.

The foam-forming agent is preferably passed through screens 16 in the pipe 13 and the formation of foam is done preferably with the aid of balls 15 of glass or the like which are kept in constant motion by the flowing foam-forming medium, so that the latter is submitted to a particularly effective degree of agitation. The spraying apparatus can be simplified and its overall dimensions reduced if both admission pipes 14 and 13 are coaxial. The screens 16 may be located at several relatively spaced points along the length of pipe 13. At one end, this pipe is threaded at 19 for a screw attachment of a short tube 17.

This cylindrical short length of tube 17 which surrounds coaxially the admission pipe 14 is fitted with turbine-like nozzle blades of the like 17a. The arrangement may be such that the blades impart a left hand or a right hand rotary motion to the foam-forming medium, the latter therefore swirling into a mixing chamber formed by the short tube 17 and a chamber wall 22. The nozzle blades may be fitted with relatively different pitch, for instance, in such a way that the foam-forming medium passing through the upper half is directed in a right hand swirl and that passing through the lower half a left hand swirl, or conversely. Moreover, blades with left and right hand pitch may be disposed in groups in other ways.

The other admission pipe 14 for the synthetic resin solution as the hardener is likewise provided with fixing means, such as a screw thread 20, at its end for detachably securing thereto a sprayer head 18. Either a cylindrical sprayer head with one or several orifices 21 in the end thereof may be used, or the sprayer head may have the shape of a disc, a hemispherical cap or some other spherical body. The synthetic resin solution enters the mixing chamber in the form of a relatively fine jet or spray. The mixing effect can be substantially improved by an impingement member 23 of the kind shown in FIG. 1 and FIG. 3. This member faces the end of pipe 14 so that the solution of synthetic resin strikes it with the result that it is atomized into fine particles. The impingement face may be flat or the upper and lower halves of the face may be set at a relative angle in such manner that the face of each half reflects into the direction of flow of the foam forming medium. Alternatively the face of the impingement member may be coned. For reducing the resistance to flow the rear portion of the impingement member is elongated into a body of revolution or it may be pear shaped.

The impingement member 23 is adjustably mounted on a threaded shaft 24 mounted in a bracket 25. The impingement member 23 itself is prevented from rotating by stays 23a which engage grooves in the wall 22 of the chamber. Shaft 24 carries a bevel gear 24a meshing with a cooperating bevel gear 26a which can be manually turned with the help of a thumb wheel 26. The impingement member 23 can thus be shifted forward and backwards by rotation of the thumb wheel 26.

The front pipe section formed by the chamber wall 22 is screwed onto the end of tube 17 at 22a. By removing the pipe section 22 access can therefore be gained to the mixing chamber and the outlet orifices of the two pipes 14 and 13. Moreover, the short tubular section 17 containing the blades 17a can be removed and replaced by a different member containing some other type of blading for the generation of swirl.

If a taper nozzle 18a is provided, as shown in FIG. 5, then the synthetic resin solution will emerge from orifice 21a at a much increased speed, the jet being finer, and atomization will be correspondingly finer. The atomizer head and the impingement member should preferably consist of metal.

In order to permit the foam in the mixing chamber to be even better controlled, there may be provided a further pipe 28a for the additional introduction of a compressed gas, such as air or $CO_2$. One end of this admission pipe communicates with a cylinder for compressed gas which is not shown in the drawing, whereas the other end extends into the mixing chamber. In the axial direction the end of this pipe is located downstream of the swirl blading 17a though upstream of the orifice from which the synthetic resin solution emerges. By the controlled injection of air the foaming effect can be increased and diminished.

In the form of invention illustrated in FIGS. 6 and 7 atomization of the synthetic resin solution entering through pipe 14 is effected exclusively by means of a compressed gas which is admitted through duct 28a. The sprayer head 18d of pipe 14 has radial outlet orifices 21b, whereas the annular duct 28a discharges the compressed gas through individual holes 28b. The axes of the holes 28b intersect the axes of the outlet orifices 21b at right angles. The jets of compressed air blow at right angles across filaments of synthetic resin solution emerging from the outlet orifices and thus propel them into the foam substantially in the form of a very fine mist. The number of orifices 21b is the same as that of the holes 28b. In principle this number is arbitrarily selectable.

In the form of invention shown in FIG. 8 atomization is obtained by means of an impingement plate 23b in cooperation with a jet of compressed gas which issues from a pipe 28c. The synthetic resin solution enters a widening chamber 14b through pipe 14 and a constriction 14a and impinges upon a fixed impingement or baffle plate 23b from which it is projected radially outwards through radial holes 21c. The radially emerging synthetic resin solution is finally disintegrated and distributed by the transverse gas jet issuing from pipe 28c.

In some instances the impingement body 23 may also be rotatable and its speed of rotation controllable. Moreover, the face of the impingement member may be provided with blades, laminations or the like for imparting a left or right hand swirl to the reflected particles. Further, the entire sprayer head might be rotatable.

FIGS. 9 to 11 illustrate a preferred embodiment of distributor head 27. The foam forming medium is supplied through pipe 10, pipe 11 supplies the synthetic resin solution and pipe 12 supplies the compressed air. Each pipe is controlled by a valve 10a, 11a and 12a. All three valves can be simultaneously operated, that is to say, opened or closed, by the deflection of the single handle 29. To this end each valve spindle may carry a twoarmed lever 30 and the ends of the levers are connected articulatedly with cross links 31 and 31a at 32 and 32a. The handle 29 is fixed to the lever mounted on the valve 11a. By deflecting handle 29 all three valves can be operated simultaneously. If desired, the simultaneous actuation of the valves might be effected by hydraulic or electric actuating means.

In order to facilitate assembly and production, the distributor head 27 may comprise a number of coaxial parts which may be threadedly connected together or secured by screws 33. A circular plate-shaped member 34 is formed with a central hub for the reception of a short tubular member 35 with a central opening 36. A collar 37 on the distributor head 34 forms an air chamber 42 around the tubular member 35. This chamber communicates either through a plurality of separate holes or through a circular gap 38 with the interior of pipe 14. When compressed air is forced through pipe 12 into the distributor head, it can pass through an orifice 40 controlled by a screw valve 39 into a coaxial annular chamber 41.

A second radially located screw valve 39a controls a second orifice 50 in collar 37, through which the compressed air can then enter the air chamber 42, and from which it issues either in the form of very fine jets but preferably in the form of a cylindrical curtain of air through the annular gap 38. The air velocity is higher than the velocity of the synthetic resin solution in the tubular member 35, 36 so that the resin is vigorously torn away from the end of the tubular member and thoroughly divided and distributed. After having been loosened up further by the balls 15, the synthetic resin enters the mixing chamber at 17.

The foam-forming medium enters an annular chamber 10b surrounding pipe 13 in the distributor head. The wall of the pipe is perforated at this point and provides a multitude of orifices 43 through which the foam-forming medium can flow into the interior of the wider pipe 13 wherein it passes through a screen 44 and a packing of glass balls 15 and then enters the mixing chamber 17. This arrangement distributes the foam-forming medium across the entire cross-section of the pipe, so that it emerges in a very uniform manner. The compressed air in annular chamber 41 can gain access to the foam-forming medium for the generation of foam through a plurality of small openings 45, 46. Preferably a plate 47 forms one side of chamber 41 so that the chamber is closed, though giving access to the foam-forming medium through the orifices 45, 46. These orifices form at least one circular row. The air is thus uniformly distributed across the entire circumference and the foaming action is more uniform. A gasket 48 consisting of a material which is resistant to the synthetic resins used and their solvents, is interposed between plate member 34 of the distributor head and backing plate 47. The plates are held together by screws 33.

It is preferred to arrange the rows of orifices 43, 45, 46 for the foam-forming medium and for the air in such a way that in longitudinal section they are approximately located in the same place. The distribution of the foam-forming medium is thus further refined because each jet of foam-forming medium can thus be crossed by an air jet and a very intense atomization achieved. Moreover, the air jet effects the maximum volume of foam-forming medium. The particle division is not only finer, but an improved effect is also obtained with less compressed air. A similar finer loosening and division by air jets and the annular gap at 38 is further achieved in the neck 35a of the tubular member 35.

In a further development of the invention the orifices 43 through which the foam-forming medium from the admission pipe 10 enters pipe 13 may be adjustable. Screw valves 49 may be radially inserted into the distributor head in such manner that their ends control the orifices 43 for adjusting the cross-section of the orifices as may be desired. The rate of air admission and hence the velocity of entrainment of the synthetic resin in pipe 14 can therefore be regulated by means of the screws 39 and 39a and the air admission and hence the propelling thrust of the actual foam-forming medium through pipe 13 adjusted and varied.

Although the apparatus proposed by the invention has been described as a spraying device for the continuous production of plastic foams and the like, the invention is not intended to be thus limited. It can also be used for mixing any desired media, for instance, for mixing a solvent with some other liquid containing solid particles, such as lacquer pigments or the like. Another application is that of more intimately mixing a number of liquid components, premixed liquids and so forth, and it is also suitable for the production of suspensions in fine division in liquids.

It is a further object of the invention to provide a manually operated pressure regulation before the entry of the synthetic resin solution into the low pressure-regulating valve whereby the velocity and the passing quantity may be increased or reduced so that foams with different specific weights may be produced. Therefore, the finished foam issues from the spraying apparatus continuously as a creamy coherent mass or intermittently in the form of large flakes. The result depends on the existing pressure conditions. The spraying apparatus may be provided with pressure gauges for making visible the pressures of the three agents.

For the production of a foamed plastic material 100 parts by weight of an urea-formaldehyde condensation product hardenable by acid and 200 parts by weight of water form 300 parts by weight of a synthetic resin solution. 280 parts by weight of water, 12 parts by weight of an 85% phosphoric acid and 8 parts by weight of a foam-forming agent as, for example, a butylated naphthalene sulfonic acid, form 300 parts by weight of foam-forming solution with a hardening agent.

Both solutions are pressurized (compressed air of for example 71 p.s.i.) in separate containers and are pressed by means of tubes resistant to compression through discharge orifices of the containers into the spraying apparatus. After opening of the low-pressure valves, these solutions enter into the mixing chambers.

By a separate tube resistant to compression, the compressed air is likewise supplied to the spraying apparatus. After opening of the three valves by means of the coupling lever, the foam-forming solution is foamed in the presence of the compressed air which has, for example, a pressure of 71 p.s.i., and simultaneously the synthetic resin solution is foamed and intimately mixed with the foam. Immediately after commixture, the finished mixed foam issues from the spraying apparatus.

I claim:

1. A foam-producing spraying apparatus comprising, at least two coaxially related pipes forming inner and outer chambers having an upstream and downstream end; conduit means connected to the upstream end of said respective inner and outer chambers for directing a supply of mixable fluid material thereto; mechanical pre-foaming means disposed in the outer chamber promoting the formation of foam in the fluid material passing therethrough prior to mixture with the fluid in the inner chamber; restricting means on the downstream end of said inner chamber controlling the emission of fluid for mixture with the pre-foamed fluid material; and a chamber-forming member secured to said pipe forming said outer chamber and forming a mixing chamber downstream of said inner and outer chambers and in which said supply of pre-foamed fluid material and fluid from the chambers are mixed prior to leaving said apparatus.

2. The structure as claimed in claim 1 in which said conduit means includes a fluid pressure conduit communicating with the upstream end of the outer chamber for directing a supplemental supply of fluid for increasing the pre-foaming of the fluid passing through said outer chamber.

3. The structure as claimed in claim 1 in which said mechanical, pre-foaming means comprises perforated baffles extending transversely of said outer chamber, and a plurality of ball elements restrained in transverse relation in said outer chamber by said baffles.

4. The structure as claimed in claim 1 including a conduit extending longitudinally between said inner and outer chambers and having an outlet at the downstream end of said inner chamber for supplying an inert fluid promoting mixing of the pre-foamed fluid and the fluid from said respective outer and inner chambers.

5. The structure as claimed in claim 1 including annular vane means circumposed about an intermediate portion of said inner chamber at the downstream end of said outer chamber for causing a circular movement to said pre-foamed fluid.

6. The structure as claimed in claim 1 in which said inner chamber includes a terminal nozzle element including a closed terminal end and lateral orifice portions for directing fluid from said inner chamber laterally into the path of movement of the pre-foamed fluid.

7. The structure as claimed in claim 1 in which said chamber-forming member includes an impingement member therein in spaced longitudinal alignment with the downstream end of said inner chamber for atomizing the fluid emitted from the inner chamber into the path of travel of said pre-foamed fluid.

8. The structure of claim 7 including means in said chamber-forming member adjustably supporting said impingement member for adjusted movement toward and away from said downstream end of said inner chamber.

9. The structure as claimed in claim 1 in which said apparatus comprises a distributor head including concentric, annular channels respectively communicating with said inner and outer chambers upstream of said chambers.

10. The structure as claimed in claim 9 wherein a tubular element extends coaxially into the upstream end of said inner chamber, said tubular element forming an annular passage with said inner chamber for connection to one of said conduit means for one of said fluid materials.

11. The structure as claimed in claim 9 including control valve means interposed in said concentric annular channels for controlling fluid flow therethrough.

12. The structure as claimed in claim 1 including individual control valves connected to said conduit means, and operator means connected to each of said individual control valves for simultaneously operating the same and controlling the fluids passing therethrough.

References Cited by the Examiner
UNITED STATES PATENTS

| | | | |
|---|---|---|---|
| 2,630,183 | 3/53 | Foutz | 239—432 |
| 2,929,436 | 3/60 | Hampshire | 239—428 |
| 2,988,343 | 6/61 | Edwards et al. | 169—15 |
| 3,010,658 | 11/61 | Rutter | 239—424 |

EVERETT W. KIRBY, *Primary Examiner.*

LOUIS J. DEMBO, *Examiner.*